United States Patent
Kuo

(10) Patent No.: US 9,124,558 B2
(45) Date of Patent: Sep. 1, 2015

(54) METHOD AND APPARATUS OF HANDLING DATA DECRYPTION FOR A PACKET DATA CONVERGENCE PROTOCOL LAYER IN A WIRELESS COMMUNICATION SYSTEM

(75) Inventor: Richard Lee-Chee Kuo, Taipei (TW)

(73) Assignee: INNOVATIVE SONIC LIMITED, Ebene (MU)

(*) Notice: Subject to any disclaimer, the term of this patent is extended or adjusted under 35 U.S.C. 154(b) by 1892 days.

(21) Appl. No.: 12/255,672

(22) Filed: Oct. 22, 2008

(65) Prior Publication Data

US 2009/0103493 A1 Apr. 23, 2009

Related U.S. Application Data

(60) Provisional application No. 60/981,518, filed on Oct. 22, 2007.

(51) Int. Cl.
  *H04L 29/06* (2006.01)
  *H04W 12/02* (2009.01)

(52) U.S. Cl.
  CPC .......... *H04L 63/0428* (2013.01); *H04W 12/02* (2013.01)

(58) Field of Classification Search
  CPC combination set(s) only.
  See application file for complete search history.

(56) References Cited

U.S. PATENT DOCUMENTS

| | | | |
|---|---|---|---|
| 2003/0157927 A1* | 8/2003 | Yi et al. | 455/411 |
| 2003/0235212 A1* | 12/2003 | Kuo | 370/503 |
| 2005/0270996 A1* | 12/2005 | Yi et al. | 370/312 |
| 2007/0041382 A1* | 2/2007 | Vayanos et al. | 370/394 |
| 2007/0242683 A1 | 10/2007 | Pelletier | |
| 2010/0220638 A1* | 9/2010 | Carmon et al. | 370/310 |

FOREIGN PATENT DOCUMENTS

| | | |
|---|---|---|
| JP | 8-503113 | 4/1996 |
| JP | 2002-530021 A | 9/2002 |
| JP | 2003-525556 A | 8/2003 |
| WO | 0076194 A1 | 12/2000 |
| WO | 2006083134 A1 | 8/2006 |
| WO | 2006116620 A2 | 11/2006 |
| WO | 2007004051 A1 | 1/2007 |

OTHER PUBLICATIONS

3GPP TS 36.323 v1.0.0 titled "Evolved Universal Terrestrial Radio Access (E-UTRA); Packet Data Convergence Protocol (PDCP) specification", Sep. 24, 2007, website <http://www.3gpp.org/ftp/specs/html-info/36323.htm>.*
Office Action on corresponding foreign application (JP2008-271140) from JPO dated May 17, 2011.

* cited by examiner

*Primary Examiner* — Alpus H Hsu
*Assistant Examiner* — Yee Lam
(74) *Attorney, Agent, or Firm* — Blue Capital Law Firm, P.C.

(57) ABSTRACT

The present invention provides a method of handling data decryption for a Packet Data Convergence Protocol layer of a user equipment upon handover in a wireless communication system for increasing the validness of deciphering packages in the wireless communication system, which includes using a security variables corresponding to a source base station for deciphering the packets received from the source base station when the user equipment performs a handover procedure.

8 Claims, 4 Drawing Sheets

METHOD AND APPARATUS OF HANDLING DATA DECRYPTION FOR A PACKET DATA CONVERGENCE PROTOCOL LAYER IN A WIRELESS COMMUNICATION SYSTEM

CROSS REFERENCE TO RELATED APPLICATIONS

This application claims the benefit of U.S. Provisional Application No. 60/981,518, filed on Oct. 22, 2007 and entitled "Method and Apparatus for Improving Security Handling in PDCP during Handover Procedure in a Wireless Communication System", the contents of which are incorporated herein by reference.

BACKGROUND OF THE INVENTION

1. Field of the Invention

The present invention relates to a method and apparatus of handling data decryption in a wireless communication system, and more particularly, to a method and apparatus of handling data decryption for a packet data convergence protocol layer of a user equipment upon handover in a wireless communication system.

2. Description of the Prior Art

The third generation mobile telecommunications system (called 3G system) provides high frequency spectrum utilization, universal coverage, and high quality, high-speed multimedia data transmission, and also meets all kinds of QoS requirements simultaneously, providing diverse, flexible, two-way transmission services and better communication quality to reduce transmission interruption rates. However, due to demand for high-speed and multimedia applications, the next generation mobile telecommunications technology and related communication protocols have been developed.

Long Term Evolution wireless communications system (LTE system), an advanced high-speed wireless communications system established upon the 3G mobile telecommunications system, supports only packet-switched transmission, and tends to simplify the system structure and reduce transmission delay, so as to enhance transmission rate.

In the LTE system, upon a handover the RLC (Radio Link Control) layer in a user equipment (UE) is allowed to deliver out-of-sequence PDUs (Protocol Data Units) from a source base station to the PDCP layer. The PDCP (Packet Data Convergence Protocol) layer is an upper layer of the RLC layer, and is used for deciphering the PDUs, to avoid user data and certain signaling information being stolen. The out-of-sequence delivery means that packets are delivered to an upper layer out of order of sequence numbers.

Generally, decryption in the wireless communication system depends on a security parameter set, which includes a key and other parameters or variables, such as a count value, a bearer identity, and directions of packets. A UE utilizes a specified algorithm to decipher the cipher-text data according to the security parameter set, to generate the plain-text data.

The count value is composed of a receiver HFN (hyper frame number) and an SN (sequence number) embedded in the header of a packet. HFN is similar to the carrying number of SN. Each time SN wraps around its maximum representing value back to 0, HFN is incremented by one. For example, if SN is represented by 7 bits, which counts from 0 to 127, once SN is beyond 127, HFN is incremented by 1, and SN restarts from 0. As a result, according to SN, a sender and a receiver can timely increment HFN, so as to keep synchronization of HFN and maintain ciphering and deciphering process. Moreover, before deciphering packets, the PDCP layer compares SN embedded in a header of a packet with next expected PDCP receiver sequence number (Next_PDCP_RX_SN) maintained in the PDCP layer. If SN is smaller than Next_PDCP_RX_SN, it means that SN is beyond 127, and has to be restarted from 0. Therefore, the receiver HFN (RX_HFN) is incremented by 1, to keep synchronization with the sender. The above description shows that the PDCP layer needs to maintain a Next_PDCP_RX_SN and a RX_HFN for deciphering packets.

According to the prior art, upon handover a deciphering process in the PDCP layer of the UE operating in an Unacknowledged Mode (UM) of the RLC layer resets the security variables, namely a Next_PDCP_RX_SN and a RX_HFN, and then deciphers packets received from the source base station. Resetting the Next_PDCP_RX_SN and the RX_HFN is needed due to key change in the target base station.

However, these packets are ciphered by the source base station before handover utilizing a count value generated by security variables which are not reset, while the UE utilizes the reset security variables to decipher packets during handover. In this situation, the UE cannot decipher packets received from the source base station correctly. For example, a UE and a source base station process a streaming media broadcast service (a service in UM). At beginning of handover, HFNs in the source base station and the UE (i.e. TX_HFN and RX_HFN) are both "120" for generating a count value to cipher and decipher packets. Just before handover, parts of the packets are stored in the RLC layer due to out of sequence. Upon handover, these out-of-sequence packets are delivered to the PDCP layer. Before these packets are deciphered, the UE resets the Next_PDCP_RX_SN and the RX_HFN to "0" according to a handover process of the prior art. As a result, when deciphering packets, the RX_HFN utilized by the UE is different from the TX_HFN utilized by the source base station for deciphering the packets. Therefore, the packets cannot be deciphered correctly. In this situation, though these packets are deciphered and sent to an upper layer, incorrect deciphered data will cause error in media broadcast image, and affect the service quality.

Therefore, in the prior art, since the reset security variables are different from the security variables utilized by the source base station for ciphering packets, a user equipment upon handover will encounter a situation of deciphering failure or deciphering packets into invalid data when deciphering the packets received from the source base station.

SUMMARY OF THE INVENTION

Therefore, the present invention provides a method and apparatus of handling data decryption for a packet data convergence protocol (PDCP) layer of a user equipment upon handover in a wireless communication system, to correctly decipher packets received from a source base station.

The present invention discloses a method of handling data decryption for a packet data convergence protocol (PDCP) layer of a user equipment upon handover in a wireless communication system. The method includes using security variables corresponding to a source base station for deciphering packets received from the source base station when the user equipment performs a handover procedure.

The present invention further discloses a communication device utilized in a wireless communication system for correctly handling data decryption in a packet data convergence protocol (PDCP) layer upon handover. The communication device includes a control circuit for realizing functions of the communications device, a processor installed in the control circuit, for executing a program code to command the control circuit, and a storage device installed in the control circuit and coupled to the processor, for storing the program code, wherein the program code includes using security variables corresponding to a source base station for deciphering packets received from the source base station when the communication device performs a handover procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
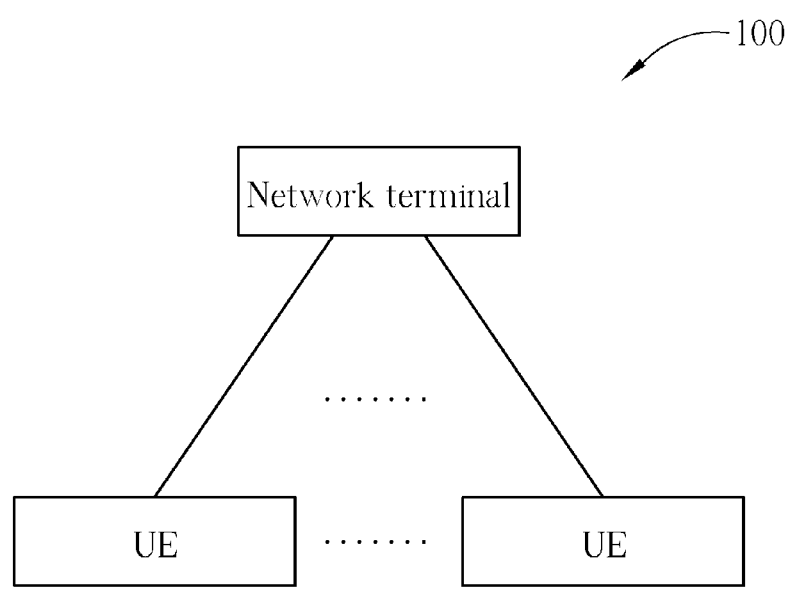
FIG. 1 is a schematic diagram of a wireless communication system.

Please refer to FIG. 1, which is a schematic diagram of a wireless communications system 100. The wireless communications system 100 is preferred to be a LTE system, and is briefly formed with a network terminal and a plurality of user equipments. In FIG. 1, the network terminal and the user equipments (UEs) are simply utilized for illustrating the structure of the wireless communications system 100. Practically, the network terminal may include a plurality of base stations, radio network controllers, and so on according to actual demands, and the UEs can be apparatuses such as mobile phones, computer systems, etc.

Figure 2:
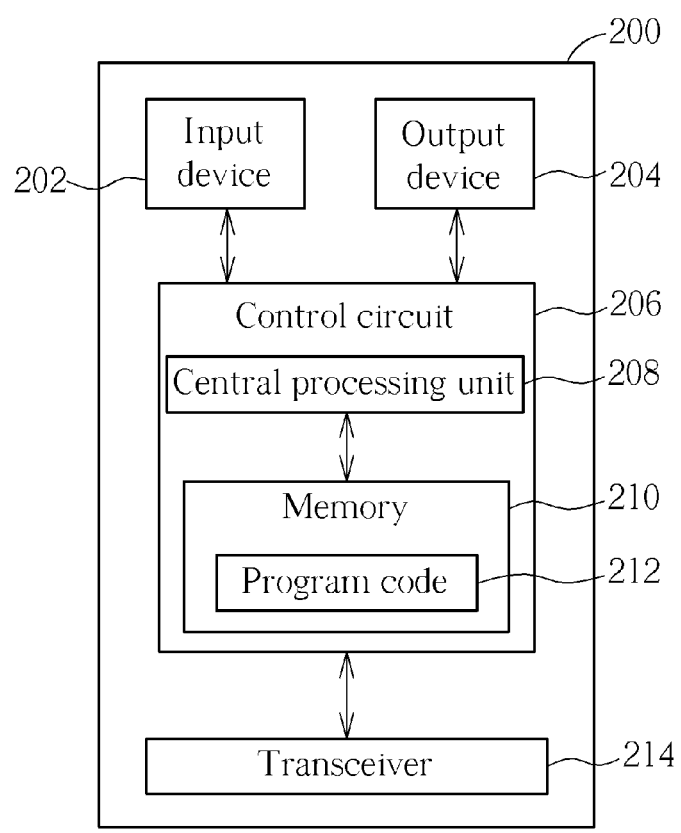
FIG. 2 is a functional block diagram of a wireless communication device.

Please refer to FIG. 2, which is a functional block diagram of a communications device 200, which can be utilized for implementing the user equipment shown in FIG. 1. For the sake of brevity, FIG. 2 only shows an input device 202, an output device 204, a control circuit 206, a central processing unit (CPU) 208, a memory 210, a program code 212, and a transceiver 214 of the communications device 200. In the communications device 200, the control circuit 206 executes the program code 212 in the memory 210 through the CPU 208, thereby controlling an operation of the communications device 200. The communications device 100 can receive signals inputted by a user through the input device 202, such as a keyboard, and can output images and sounds through the output device 204, such as a monitor or speakers. The transceiver 214 is used for receiving and transmitting wireless signals, delivering received signals to the control circuit 206, and outputting signals generated by the control circuit 206 wirelessly. From a perspective of a communications protocol framework, the transceiver 214 can be seen as a portion of Layer 1, and the control circuit 206 can be utilized to realize functions of Layer 2 and Layer 3.

Figure 3:
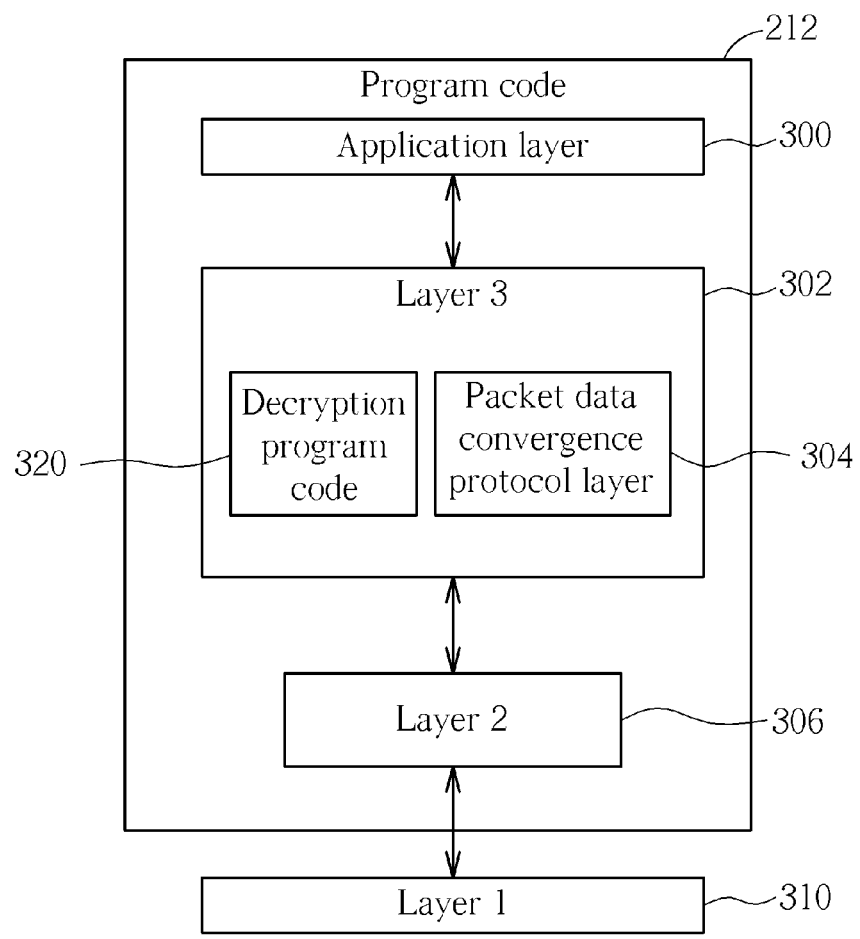
FIG. 3 is a diagram showing a structure of the application layers of the program code shown in FIG. 2.

Please continue to refer to FIG. 3. FIG. 3 is a diagram of the program code 212 shown in FIG. 2. The program code 212 includes an application layer 300, a Layer 3 302, and a Layer 2 306, and is coupled to a Layer 1 310. The Layer 3 302 comprises a PDCP layer 304. The Layer 2 306 is utilized for realizing link control. The Layer 1 310 is utilized for realizing physical connections. In downlink, the PDCP layer 304 receives PDU (Protocol Data Unit) from the Layer 2 306, and performs processes, such as header removal, header de-compression, decryption, etc, so as to deliver the deciphered user plane data to an upper layer (such as the application layer 300).

For the PDCP layer deciphering upon handover, the program code 212 according to the embodiment of the present invention provides a decryption program code 320 for deciphering packets received from a source base station. Please refer to FIG. 4, which is a schematic diagram of a process 40 according to an embodiment of the present invention. The process 40 is utilized in the PDCP layer of a user equipment, and is used for deciphering user plane data upon handover. The process 40 can be encoded to the decryption program code 320, and includes the following steps:

Step 400: Start.

Step 402: Use security variables corresponding to a source base station for deciphering packets received from the source base station when the user equipment performs a handover procedure from the source base station to a target base station.

Step 404: Reset the security variables.

Step 406: Reset header compression and de-compression protocol.

Step 408: End.

According to the process 40, the embodiment of the present invention uses security variables corresponding to the source base station to decipher packets received from the source base station, resets the security variables, and then resets header compression and de-compression protocol, to complete the handover procedure of the PDCP layer.

Preferably, the security variables includes a next expected PDCP receiver sequence number (Next_PDCP_RX_SN) and a receiver hyper frame number (RX_HFN).

In other words, the UE utilizes security variables corresponding to a source base station to decipher packets received from the source base station, to avoid that reset security variables cannot decipher packets received from the source base station correctly, or decipher packets into invalid data because the user equipment performs handover and resets security variables to "0" earlier than deciphering the packets received from the source base station.

In the process 40, security variables corresponding to the source base station mean unchanged security variables during a user equipment performing handover procedure. Preferably, a user equipment uses security variables to decipher packets received from the source base station before the security variables due to handover procedure are reset.

As can be seen, when a user equipment performs a handover procedure from a source base station to a target base station, the PDCP layer of the user equipment uses security variables corresponding to the source base station to decipher packets received from the source base station, to make the packets deciphered correctly, so as to increase the validness of deciphered packages in the wireless communication system.

In addition, the packets are transmitted in UM during handover, and the packets received from the source base station can be a user plane data.

Figure 4:
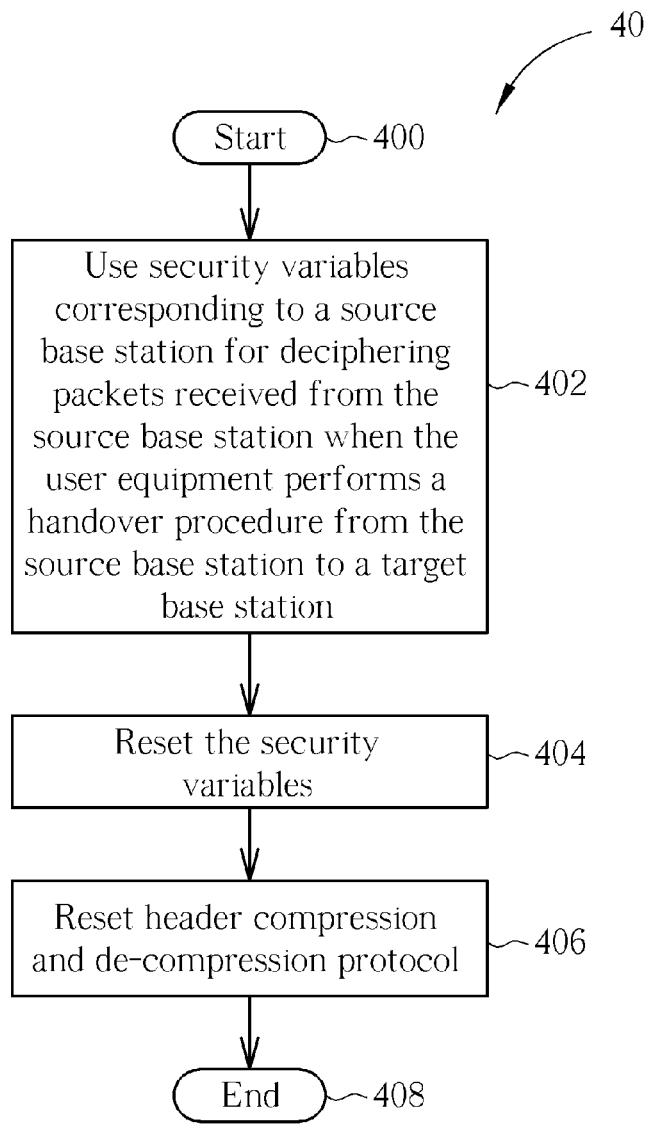
FIG. 4 is a flowchart diagram according to an embodiment of the present invention.

Please note that, FIG. 4 is a flowchart diagram according to an exemplary embodiment of the present invention, and those skilled in the art can make alternations and modifications accordingly. For example, the user equipment uses security variables corresponding to the source base station to decipher packets received from the source base station, executes Step 406 first, and then executes Step 404. The main point is that the user equipment uses un-reset security variables to decipher packets.

In the prior art, the PDCP layer deciphers the packets received from the source base station with reset security variables. Since the reset security variables differ from the security variables utilized for the source base station ciphering, the packets will be deciphered incorrectly. Compared to the embodiment of the present invention, in order to decipher correctly, the user equipment maintains security variables in the PDCP layer to decipher the packets received from the source base station, and then resets security variables after completing decryption. In this situation, the user utilizes security variables corresponding to the source base station for deciphering the packets received from the source base station, thereby correctly deciphering the packets, so as to increasing the validness of the deciphered packages in the wireless communication system.

In conclusion, the embodiment of the present invention utilizes the security variables corresponding to the source base station to decipher the packets received from the source base station, and then resets the security variables for processing in the target base station. Therefore, the user equipment can correctly decipher packets, and generate useful and valid data.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling data decryption for a packet data convergence protocol (PDCP) layer of a user equipment (UE) upon handover in a wireless communication system, the method comprising:
   initiating a handover procedure from a source base station to a target base station;
   using security variables corresponding to the source base station to decipher packets received from the source base station; and
   resetting the security variables after using the security variables to decipher all the data packets received from the source base station;
   wherein the security variables comprise a next PDCP receiver sequence number (Next_PDCP_RX_SN) and a receiver hyperframe number (RX_HFN).

2. The method of claim 1, wherein the packets received from the source base station correspond to an unacknowledged mode of a radio link control layer.

3. The method of claim 1, wherein the packets received from the source base station are utilized for user plane data transmission.

4. The method of claim 1, wherein resetting the security variables comprises setting the Next_PDCP_RX_SN to zero and setting the RX_HFN)to zero.

5. A communication device utilized in a wireless communication system for correctly handling data decryption in a packet data convergence protocol (PDCP) layer upon handover, the communication device comprising:
   a control circuit for realizing functions of the communications device;
   a processor installed in the control circuit; and
   a storage device installed in the control circuit and coupled to the processor;
   wherein the processor executes a program code stored in memory to:
      initiate a handover procedure from a source base station to a target base station;
      use security variables corresponding to a source base station to decipher packets received from the source base station; and
      reset the security variables after using the security variables to decipher all the data packets received from the source base station;
      wherein the security variables comprise a next PDCP receiver sequence number (Next_PDCP_RX_SN) and a receiver hyperframe number (RX_HFN).

6. The communication device of claim 5, wherein the packets received from the source base station correspond to an unacknowledged mode of a radio link control layer.

7. The communication device of claim 5, wherein the packets received from the source base station are utilized for user plane data transmission.

8. The communication device of claim 5, wherein resetting the security variables comprises setting the Next_PDCP_RX_SN to zero and setting the RX_HFN to zero.

* * * * *